United States Patent Office 3,000,873
Patented Sept. 19, 1961

3,000,873
ANTIBIOTIC RECOVERY PROCESS
Frank J. Wolf, Westfield, N.J., assignor to Merck & Co., Inc., Rahway, N.J., a corporation of New Jersey
No Drawing. Filed May 21, 1957, Ser. No. 660,471
5 Claims. (Cl. 260—210)

This invention relates generally to processes and methods for obtaining antibiotics from crude solutions thereof. More particularly, it is concerned with new and improved processes and methods for recovering and concentrating novobiocin and analogues thereof from fermentation broths containing elaborated novobiocin or its analogues, microorganism mycelia and suitable nutrient media. In one of its more particular aspects, this invention relates to the isolation of novobiocin, dihydronovobiocin, and other novobiocin analogues.

Novobiocin, for which the following structural formula has been proposed,

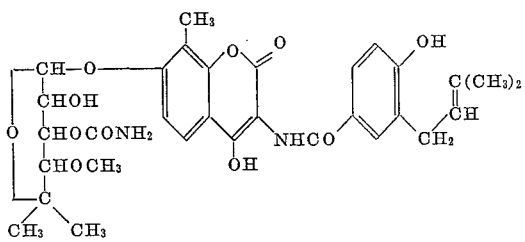

is produced by growing, under controlled conditions, a species of microorganism named *Streptomyces spheroides*, which has been deposited in the permanent culture collection of the Fermentation Section, Northern Utilization Research Bureau, United States Department of Agriculture, Peoria, Illinois, under the designation NRRL 2449. Analogues of novobiocin may be similarly produced.

Novobiocin is an acidic organic compound having two base binding groups and can be precipitated from its solution in alkalis by acidification. It is soluble in the lower alkanols, lower aliphatic ketones, acetic acid, ethyl acetate and dioxane, and is insoluble or only sparingly soluble in ether, benzene, chloroform, carbon tetrachloride, ethylene dichloride, water and hydrochloric acid.

Novobiocin is active in inhibiting growth of gram positive microorganisms primarily, although it also exhibits some activity against gram negative microorganisms. Novobiocin salts and analogues of novobiocin have antibiotic activity as well. The activity of novobiocin preparations is defined in novobiocin units, substantially pure novobiocin having an arbitrarily assigned activity of 5,000 novobiocin units per milligram.

Previously the isolation and separation of novobiocin from fermenation broths in which this antibiotic has been grown was accomplished by rather involved and time-consuming procedures, including repeated solvent extraction and recrystallization steps.

The present invention is broadly directed to a new technique for isolating novobiocin and analogues thereof which have been produced by means of fermentation processes.

An object of this invention is to provide a novel improved process for the separation and purification of novobiocin and analogues of novobiocin from the fermentation broths in which they are grown.

Another object of this invention is to provide a process for the isolation of these compounds in high yields.

A further object of the invention is to provide a commercially useful method for the recovery of novobiocin and novobiocin analogues from fermentation broths in which these compounds are elaborated.

Other objects and advantages of this invention will become apparent in the course of the following detailed description and disclosure.

It has now been found that novobiocin and analogues of novobiocin, hereinafter referred to as novobiocin-active compounds, can be recovered from crude solutions, suspensions, or other liquid materials containing these substances, including fermentation broths, crude concentrates, dilute solutions, extracts, and the like, by treatment with an anion exchange resin, from which these novobiocin-active compounds subsequently may be recovered by elution.

The process according to this invention has the advantage over prior art methods of recovering novobiocin activity by solvent extraction or solvent partition procedures, in that the volumes of solutions to be handled in the process of this invention are comparatively small and thus equipment requirements and labor requirements are minimized.

Another advantage of the process of this invention lies in the fact that substantially complete recovery of novobiocin activity is achieved by the use of anion exchange resins under optimum conditions, as compared with the merely partial recovery of novobiocin activity achievable by other methods, such as solvent extraction.

Regarded in certain of its broader aspects, the novel process according to this invention for recovering novobiocin-active compounds from solutions containing these substances, comprises treating said solutions with a strongly basic, polymeric, organic, nitrogenous anion exchange resin that essentially derives its exchange capacities from the presence of quaternary ammonium or amino groups, whereby the novobiocin activity is adsorbed on said resin, and thereafter recovering said novobiocin activity by separating the resin from the solution and eluting the novobiocin-active compounds.

The process of this invention may be practiced, as desired, by use of a suitable column or batches of a novobiocin-active material may be processed in tanks. In the first method the resin is packed in a vertical column and the solution containing the novobiocin activity is passed through the resin bed. The effluent from the column is continuously examined in order that feed to the column may be terminated when the effluent contains more than an arbitrarily set minimum acceptable level of novobiocin activity. When this level is reached solution feed is halted and the adsorbed novobiocin-active compound is eluted from the ion exchange resin column by passing through the column a solution which has the capacity of eluting the novobiocin-active compound therefrom.

The stripped resin may then be regenerated by treatment with a suitable regenerating solution and reused for the adsorption process or fresh new resin may be added to the column with the regenerated resin if desired.

In batch operations, the selected anion exchange resin is agitated in a suitable vessel with the solution containing the novobiocin-active compound, the proportions used of resin and of solution being empirically determined as a result of prior experience, and when the concentration of the novobiocin activity in the solution has been reduced to the level desired, the solution is decanted or otherwise separated from the resin. Thereafter the resin is processed to elute the novobiocin-active compound from the resin. This elution, if desired, may be performed in a column.

In one of the preferred embodiments of the instant invention novobiocin-active compounds are adsorbed upon the ion exchange resin from whole broths containing these novobiocin-active compounds. These whole broths in addition contain microorganism mycelia as well as suitable nutrients and various fermentation by-products.

Adsorption from whole broth is accomplished by adding the ion exchange resin to the broth after harvest, allowing the resin to adsorb the novobiocin-active compound in the broth, and then separating the resin having the novobiocin activity adsorbed thereon from the broth. This separation may be accomplished by filtering or screening or by any other desired method, such as the use of liquid cyclones, riffle tables, classifiers or the like. The use of screens having a mesh size in the range which is suitable for retaining the resin and passing the mycelia, normally from about 10 mesh to about 200 mesh, has been found to be particularly advantageous for this purpose, with no undue clogging of the screens with mycelia or spent broth being observed. To further facilitate this separation, a screen of the vibrating type may be used.

Ion exchange resins which are suitable for use in the practice of the process of this invention are particulate resins of the strongly basic, polymeric, nitrogenous anion exchange resin class. These are usually resins having quaternary ammonium groups attached to a styrene-divinylbenzene matrix. The "Dowex" resins, available from the Dow Chemical Co., Midland, Mich., for example, "Dowex 1–X2," "Dowex 1–X4," and "Dowex 2–X4"; the "Amberlite" resins, available from Rohm & Haas Co., Philadelphia, Pa., for example, "Amberlite IRA–400," "Amberlite IRA–401," "Amberlite IRA–411," and "Amberlite XE–98"; and the "Duolite" resins, available from Chemical Process Co., Redwood City, Calif., for example, "Duolite A–40," "Duolite A–101," and "Duolite A–102," are exemplary of the type of resin. While the above resins have been mentioned as illustrative of ion exchange resins which may be used for the adsorption of novobiocin, other ion exchange resins of the strongly basic type may also be used.

Although resin particle size is not critical, resins in the size range of from about 10 mesh to 200 mesh and preferably from about 35 mesh to 100 mesh, have been found to be especially useful in the adsorption.

For elution from the ion exchange resin of the novobiocin-activity absorbed thereon an aqueous eluting solution containing an electrolyte, preferably in an organic solvent for the antibiotic, is used. Aqueous acidic solutions containing an organic solvent for the novobiocin-active compound have been found effective for this purpose. For example, aqueous solutions of hydrochloric acid or acetic acid admixed with a suitable water miscible organic solvent such as an alcohol or ketone have been found satisfactory for the elution of the novobiocin-active compound from the ion exchange resin. The concentration of the acidic compound in the eluting solution is preferably from about 1 weight/volume percent to about 10 weight-volume percent. The organic phase may be constituted with from about 70% to about 98% of the organic solvent with from about 30% to about 2% water.

The method of elution may be either column-wise or batch-wise in operation, although column-wise operation is preferred because smaller volumes are needed, and because of the relative ease of periodic analyses of the eluate and division thereof into fractions which is readily accomplished where a column is used for elution.

The eluate may be subjected to subsequent treatment designed to further purify the eluate such as by passing through a chromatographic column, for example, a column of alumina which has been washed with dilute sulfuric acid and water, and treating the purified and decolorized eluate with an acidic solution, for example, a methanol-acetic acid solution, in order to crystallize the novobiocin acid. The resulting crystals may be filtered and washed, such as with a water-methanol solution, filtered and dried. If desired, various novobiocin salts may be prepared from this novobiocin acid by means of suitable neutralization techniques. Eluates containing novobiocin analogues, such as dihydronovobiocin, may be similarly treated to recover the novobiocin analogues from the eluates.

The process of the instant invention may be better understood by reference to the following examples. These examples are included for the purpose of exemplification only and are not to be construed as in any way limiting the scope of the instant invention.

Example 1

A 25 l. portion of a filtered fermentation broth, obtained from cultivation of a novobiocin-producing strain of *Streptomyces spheroides* in a suitable nutrient medium and containing about 7,200,000 units of novobiocin activity, is passed through a column containing 500 cubic centimeters of the ion exchange resin "Amberlite IRA–411." The resin is used on its chloride cycle. The contact time of the solution with the resin in the column is about ten minutes. The effluent shows no measurable novobiocin activity. The resin after contact with the solution, is washed with 95% methanol to remove the impurities. The novobiocin is then eluted from the resin, using a solution containing 16% concentrated hydrochloric acid and 84% methanol. The eluate is found to contain 4,500,000 units of novobiocin activity. The eluate has a total volume of less than 3 liters and contains about 62% of the novobiocin activity of the culture broth treated.

Example 2

The procedure described in Example 1 is repeated, using 33 liters of filtered novobiocin-containing fermentation broth, having an activity of 270 units of novobiocin per milliliter, and 300 cubic centimeters of the resin on the chloride cycle, with a contact time of about 25 minutes. The eluate is slightly in excess of 3 liters and is found to contain about 82% of the total novobiocin activity present in the original solution.

Example 3

Two 30 ml. portion of "Dowex 1–X2" resin, 50 to 100 mesh, on the chloride cycle, are added to 300 ml. of unfiltered novobiocin fermentation broth having an activity of 510,000 units. Each portion of the resin is screened from the spent broth by means of a 70 mesh screen, after ten minutes contact time placed in a 1 in. column, and eluted column-wise with a solution containing 16% concentrated hydrochloric acid and 84% methanol. The eluate is found to contain an activity of 202,000 units.

Example 4

Five grams of sodium dihydronovobiocin is dissolved in 500 ml. of water, and 50 ml. of "Dowex 1–X2" resin, on the chloride cycle, is added to this solution and allowed to stand for 3 hours. The resin is removed by filtration and washed with water. A 17 ml. aliquot of resin is then eluted column-wise with a solution containing 16 ml. of concentrated hydrochloric acid and 84 ml. of methanol. The eluate is found to contain 95% of the dihydronovobiocin present in the feed.

Various changes and modifications of the invention can be made, and to the extent that such variations incorporate the spirit of the instant invention, they are intended to be included within the scope of the appended claims.

What is claimed is:

1. In an ion exchange process for the recovery of novobiocin from mixtures containing the same wherein the novobiocin is adsorbed on a strongly basic anion exchange resin the improvement which comprises eluting the adsorbed novobiocin from the resin with an acidic eluting solution consisting of an aqueous organic solvent mixture containing about 70 percent to about 98 percent of an organic solvent selected from the group consisting of lower aliphatic alcohols and lower aliphatic ketones and an acid present in the said acidic eluting solution in a concentration of from about 1 weight/volume percent to about 10 weight/volume percent.

2. The process of claim 1 wherein the mixture containing novobiocin is derived from a fermentation broth for the production of said novobiocin.

3. The process of claim 1 wherein the mixture containing novobiocin is a filtered fermentation broth containing said novobiocin.

4. The process of claim 1 wherein the mixture containing novobiocin is an unfiltered fermentation broth containing said novobiocin.

5. In an ion exchange process for the recovery of novobiocin from mixtures containing the same wherein the novobiocin is adsorbed on a strongly basic ion exchange resin the improvement which comprises eluting the adsorbed novobiocin from the resin with an aqueous solution comprising 16 percent concentrated hydrochloric acid and 84 percent methanol.

References Cited in the file of this patent

UNITED STATES PATENTS

| | | |
|---|---|---|
| 2,541,420 | Howe et al. | Feb. 13, 1951 |
| 2,629,710 | McBurney | Feb. 24, 1953 |
| 2,689,227 | McBurney | Sept. 14, 1954 |
| 2,786,831 | Bartels et al. | Mar. 26, 1957 |

OTHER REFERENCES

Nachod et al.: Ion Exchange Technology, page 585, Academic Press, N.Y. city (1956).

Hoeksema: "Antibiotics and Chemotherapy" vol. 6, No. 2, February 1956, pp. 143 to 148.